United States Patent
Niizuma

(10) Patent No.: US 9,912,169 B2
(45) Date of Patent: Mar. 6, 2018

(54) WIRELESS POWER SUPPLY SYSTEM

(71) Applicant: IHI Corporation, Tokyo (JP)

(72) Inventor: Motonao Niizuma, Tokyo (JP)

(73) Assignee: IHI Corporation, Tokyo (JP)

( * ) Notice: Subject to any disclaimer, the term of this patent is extended or adjusted under 35 U.S.C. 154(b) by 365 days.

(21) Appl. No.: 14/700,926

(22) Filed: Apr. 30, 2015

(65) Prior Publication Data

US 2015/0263536 A1 Sep. 17, 2015

Related U.S. Application Data

(63) Continuation of application No. PCT/JP2013/076925, filed on Oct. 3, 2013.

(30) Foreign Application Priority Data

Nov. 6, 2012 (JP) ................. 2012-244740

(51) Int. Cl.
*H01F 38/00* (2006.01)
*H02J 5/00* (2016.01)
(Continued)

(52) U.S. Cl.
CPC ............. *H02J 5/005* (2013.01); *B60L 11/182* (2013.01); *B60L 11/1829* (2013.01);
(Continued)

(58) Field of Classification Search
None
See application file for complete search history.

(56) References Cited

U.S. PATENT DOCUMENTS 8,159,601 B2 * 4/2012 Kakiuchi ............... H04N 5/232
  320/106
8,975,864 B2 * 3/2015 Kim ..................... B60L 11/182
  320/108

(Continued)

FOREIGN PATENT DOCUMENTS

CN 101983488 A 3/2011
CN 102648110 A 8/2012
(Continued)

OTHER PUBLICATIONS

International Search Report, PCT/JP2013/076925, dated Oct. 29, 2013, 2 pgs.

*Primary Examiner* — Lincoln Donovan
*Assistant Examiner* — Khareem E Almo
(74) *Attorney, Agent, or Firm* — Volpe and Koenig, P.C.

(57) ABSTRACT

A wireless power supply device, which supplies electric power to a movable body by causing an end surface of a power supply coil that is provided in an electric power supply space to face a power receiving coil that is provided in the movable body, and by electromagnetically coupling the power supply coil with the power receiving coil, includes a position setting member configured to set the end surface of the power supply coil in a vertical position in a state of not detecting entry of the movable body into the electric power supply space, and to cause a position of the end surface of the power supply coil to change from the vertical position to a horizontal position upon detecting entry of the movable body into the electric power supply space.

8 Claims, 7 Drawing Sheets

(51) Int. Cl.
   *B60L 11/18*   (2006.01)
   *B60M 7/00*    (2006.01)
   *H01F 38/14*   (2006.01)
   *H02J 17/00*   (2006.01)
   *H02J 7/02*    (2016.01)

(52) U.S. Cl.
   CPC ............ *B60M 7/003* (2013.01); *H01F 38/14* (2013.01); *H02J 7/025* (2013.01); *H02J 17/00* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 2007/0276538 A1* | 11/2007 | Kjellsson | B25J 19/0025 700/245 |
| 2010/0123452 A1 | 5/2010 | Amano et al. | |
| 2010/0253280 A1* | 10/2010 | Zhang | H02J 7/0052 320/107 |
| 2011/0018499 A1* | 1/2011 | Fujiwara | H01M 10/46 320/108 |
| 2011/0031806 A1* | 2/2011 | Altonen | E06B 9/68 307/32 |
| 2011/0204845 A1* | 8/2011 | Paparo | H01F 38/14 320/108 |
| 2012/0146576 A1* | 6/2012 | Partovi | H01F 7/0252 320/108 |
| 2012/0206098 A1 | 8/2012 | Kim | |
| 2013/0113284 A1* | 5/2013 | Altonen | H02J 3/12 307/31 |
| 2013/0221908 A1* | 8/2013 | Tang | B25J 19/005 320/107 |
| 2014/0239735 A1 | 8/2014 | Abe et al. | |
| 2015/0263536 A1* | 9/2015 | Niizuma | B60L 11/1829 307/104 |

FOREIGN PATENT DOCUMENTS

| | | |
|---|---|---|
| DE | 102011108544 A1 | 2/2012 |
| EP | 2515415 A1 | 10/2012 |
| EP | 2518862 A1 | 10/2012 |
| JP | 2010-103200 A | 5/2010 |
| JP | 2010-124522 A | 6/2010 |
| JP | 2010-226946 A | 10/2010 |
| JP | 2012-80636 A | 4/2012 |
| JP | 2012-120288 A | 6/2012 |
| JP | 2012-157167 A | 8/2012 |
| WO | 2011/074082 A1 | 6/2011 |
| WO | 2011/077493 A1 | 6/2011 |
| WO | 2012/047779 A1 | 4/2012 |
| WO | 2013/035853 A1 | 3/2013 |

* cited by examiner

WIRELESS POWER SUPPLY SYSTEM

This application is a Continuation of International Application No. PCT/JP2013/076925, filed on Oct. 3, 2013, claiming priority based on Japanese Patent Application No. 2012-244740, filed on Nov. 6, 2012, the contents of both International Application and the Japanese Application are incorporated herein by reference in their entirety.

TECHNICAL FIELD

The present invention relates to a wireless power supply system.

BACKGROUND ART

Patent Document 1 discloses a wireless power supply system that prevents a foreign object from intruding into the space formed between an electric power receiving portion that is provided at the bottom surface of a vehicle and an electric power supply portion that is embedded in a parking space, and performs power supply safely and efficiently. The wireless power supply system, as shown in FIG. 1 and FIG. 2 of Patent Document 1, prevents the intrusion of a foreign object by covering with a separator material the space between the primary coil (power supply coil) that is embedded in the parking space (ground surface) and the secondary coil (power receiving coil) that is provided in the vehicle.

RELATED ART DOCUMENTS

Patent Document

[Patent Document 1] Japanese Unexamined Patent Application, First Publication No. 2010-226946

DISCLOSURE OF THE INVENTION

Problems to be Solved by the Invention

In the related art described above, in the event of an foreign object having fallen on the separator material for some reason prior to a vehicle entering the parking space, that is, in the state of a vehicle not existing above the separator material, it is not possible to remove the foreign object. Accordingly, the related art described above is insufficient in the aspect of foreign object removal performance.

The present invention is achieved in view of the aforementioned circumstances, and has an object to more reliably remove a foreign object.

Means for Solving the Problems

The first aspect of the present invention is a wireless power supply device that supplies electric power to a movable body by causing an end surface of a power supply coil that is provided in an electric power supply space to face a power receiving coil that is provided in the movable body, and by electromagnetically coupling the power supply coil with the power receiving coil, being provided with a position setting member that sets the end surface of the power supply coil in a vertical position in a state of not detecting entry of the movable body into the electric power supply space, and that causes a position of the end surface of the power supply coil to change from the vertical position to a horizontal position upon detecting entry of the movable body into the electric power supply space.

According to the second aspect of the present invention, the position setting member in the first aspect is provided with: a moving body sensor that detects entry of the moving body into the electric power supply space; a support mechanism that rotatably supports the power supply coil around an axis parallel to the end surface of the power supply coil; an actuator that rotates the power supply coil; and a position control portion that controls the actuator based on a detection result of the moving body sensor.

According to the third aspect of the present invention, the position setting member in the first aspect is provided with: a support mechanism that rotatably supports the power supply coil around an axis parallel to the end surface of the power supply coil; an elastic body that biases the power supply coil in a predetermined direction to set the power supply coil in a vertical position; and an abutting portion that is provided on the power supply coil, and that causes the position of the power supply coil to change from the vertical position to the horizontal position by abutting the moving body that has entered the electric power supply space.

According to the fourth aspect of the present invention, the axis of the power supply coil in the second or third aspect passes through a center or gravity center of the power supply coil.

According to the fifth aspect of the present invention, the axis of the power supply coil in the second or third aspect passes through an end portion of the power supply coil.

According to the sixth aspect of the present invention, the axis of the power supply coil in the second or third aspect passes through a gravity center of the power supply coil.

Effects of the Invention

According to the present invention, since an end surface of the power supply coil is in a vertical position in the state of a moving body not entering an electric power supply space, there is no foreign object on the end surface, and therefore it is possible to remove more reliably than before a foreign object.

EMBODIMENTS FOR CARRYING OUT THE INVENTION

Hereinafter, a first embodiment of the present invention will be described with reference to the drawings.

Figure 1:
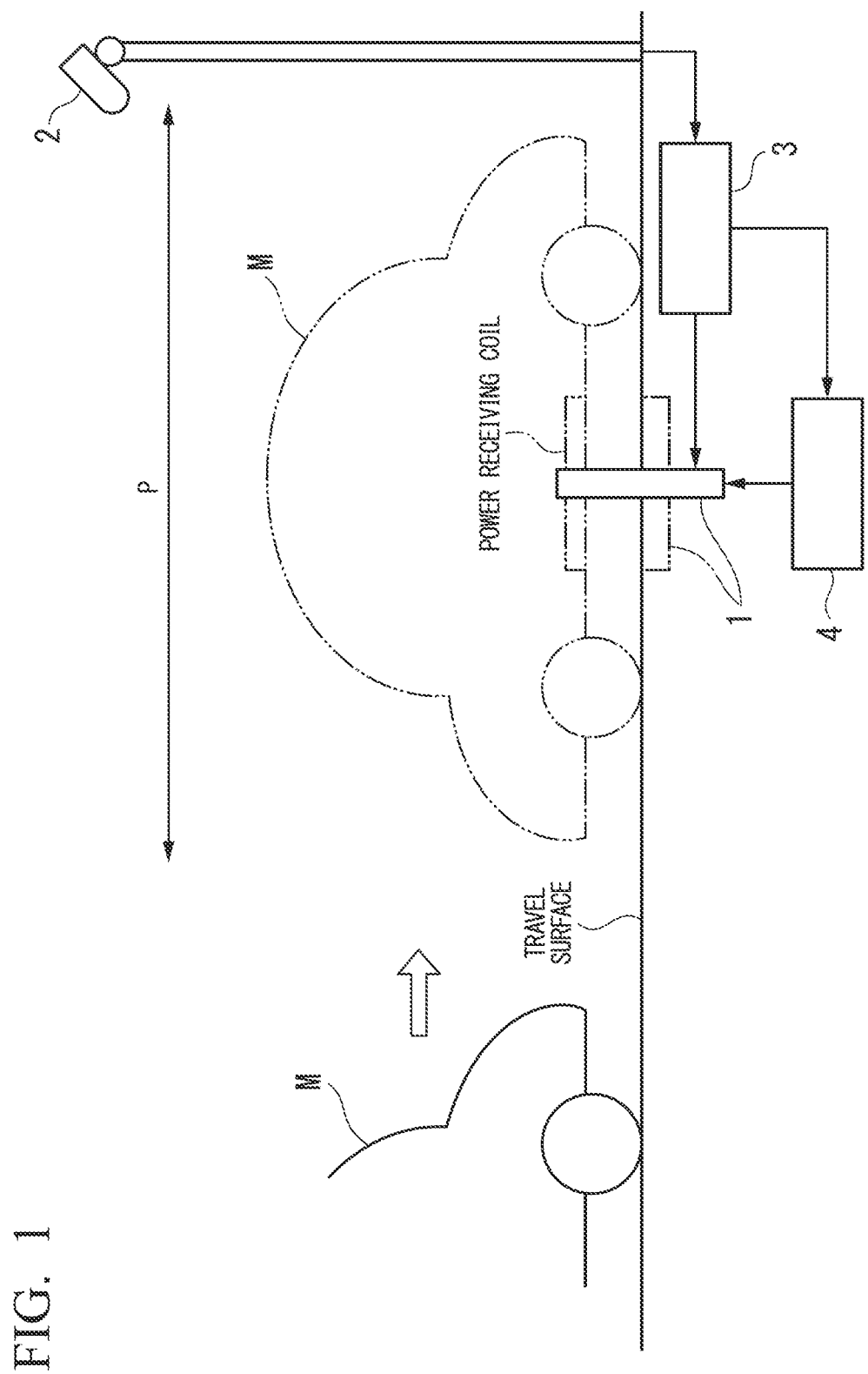
FIG. 1 is a block drawing of the wireless power supply device according to the first embodiment of the present invention.

The wireless power supply device according to the present embodiment is as shown in FIG. 1 constituted by a power supply coil mechanism 1, a vehicle sensor 2 (movable body sensor), a position control portion (position controller) 3 and an electric power supply control portion (electric power supply controller) 4. Note that among these constituent elements, the power supply coil mechanism 1, the vehicle sensor 2, and the position control portion 3 constitute a position setting member in the present embodiment.

The wireless power supply device is provided in various types of parking spaces P (rectangular regions). A vehicle M enters the parking space P from a predetermined direction and parks, and leaves in the predetermined direction or in the opposite direction. The parking space P is provided on the site (on the ground surface) of for example a commercial facility, or in an automated parking lot (multistory parking lot) provided as machinery equipment in a commercial facility.

The power supply coil mechanism 1 is embedded in the travel surface of the parking space P (electric power supply space) as shown in FIG. 1, and is set to a vertical position (shown by solid line) by the position control portion 3 in the state of the vehicle M (movable body) not having entered the parking space P (electric power supply space), and is set to a horizontal position (shown by two-dot chain line) by the position control portion 3 in the state of the vehicle M having entered the parking space P (electric power supply space). The power supply coil mechanism 1 transmits electric power to the vehicle M by mutually facing from a fixed distance and electromagnetically coupling with a power receiving coil that is provided horizontally in the vehicle M.

Figure 2A:
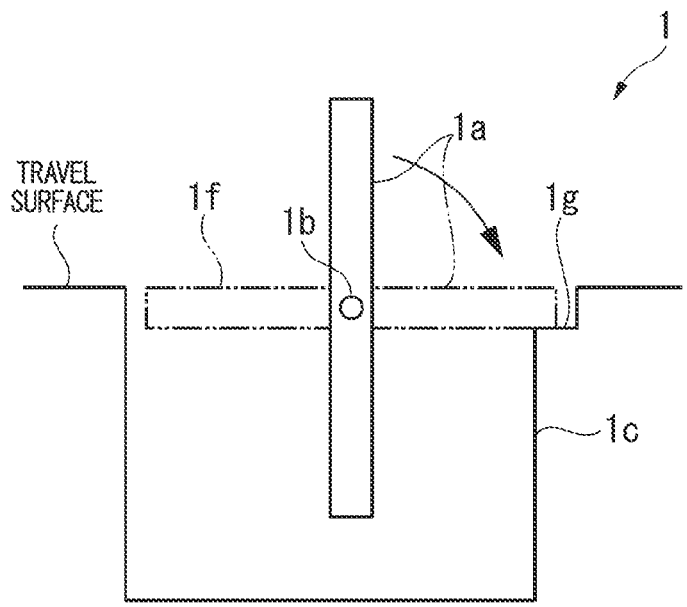
FIG. 2A is a schematic drawing showing the detailed constitution of the power supply coil mechanism of the wireless power supply device according to the first embodiment of the present invention.
Figure 2B:
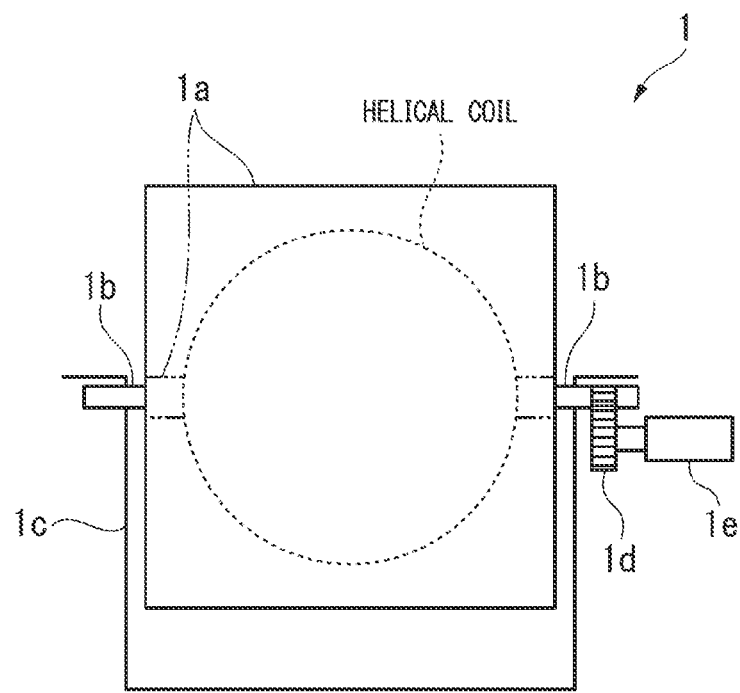
FIG. 2B is a schematic drawing showing the detailed constitution of the power supply coil mechanism of the wireless power supply device according to the first embodiment of the present invention.

Note that in FIG. 1, in order to make the characteristic of the power supply coil mechanism 1 easily understood, the position of the power supply coil mechanism 1 is schematically shown to change depending on the existence of the vehicle M, but the member that actually changes between a vertical position and a horizontal position by the existence of the vehicle M is a power supply coil 1a that is one of the constituent elements of the power supply coil mechanism 1 as shown in FIG. 2A and FIG. 2B.

That is to say, the power supply coil mechanism 1 is constituted by the power supply coil 1a, a pair of rotation shafts 1b and 1b, a housing frame 1c, a reducer 1d, and a motor 1e. Among these constituent elements, the power supply coil 1a is cast in a square or rectangular plate shape by molding electric wires wound in an annular shape (a helical coil having a predetermined coil diameter) in a resin material that allows an electromagnetic field to pass through.

The power supply coil 1a wirelessly transmits electric power to the vehicle M by electromagnetically coupling with the power receiving coil through an end surface 1f of the power supply coil 1a, that is, the upper surface (electric power supply surface) facing the power receiving coil (horizontal position) of the vehicle M when the power supply coil 1a is in a horizontal position. As the power supply coil 1a is molded in a resin material that allows an electromagnetic field to pass through, and the electromagnetic field that is generated by the electric wires and that transfers energy in wireless power supply is not impeded by the resin material, efficient wireless power supply is possible.

The back surface of the end surface 1f, that is, the lower surface (electric power supply back surface) when the power supply coil 1a is in a horizontal position, is magnetically shielded by an appropriate metal so that the magnetic flux is concentrated at the end surface 1f.

The pair of rotation shafts 1b and 1b are each provided in a projecting manner so that both axial centers are coaxial at the center of one pair of two pairs of parallel surfaces (side surfaces of the power supply coil 1a) that are perpendicular to the end surface 1f. That is to say, both axial centers of the pair of rotation shafts 1b and 1b pass through the center of the power supply coil 1a, and the rotation shafts 1b and 1b project out from both ends of the power supply coil 1a so as to be parallel to the end surface 1f.

The housing frame 1c is a member with a rectangular parallelopiped shape that is embedded in the parking space P so that the upper end is flush with the travel surface of the parking space P. The housing frame 1c is provided with a pair of bearings (not illustrated) that rotatably support the pair of rotation shafts 1b and 1b at one of the two pairs of vertical surfaces that are parallel and facing. That is to say, the housing frame 1c and the aforementioned pair of rotation shafts 1b and 1b constitute a support mechanism that rotatably supports the power supply coil 1a around an axis parallel to the end surface 1f of the power supply coil 1a. Normally, the pair of bearings are provided at the same depth from the travel surface, and so if the travel surface is horizontal, the rotation shafts 1b and 1b are also horizontal.

The housing frame 1c forms, as illustrated, a space that houses the lower half portion of the power supply coil 1a in a vertical position, and supports the rotation shafts 1b and 1b so that the end surface 1f is flush with the travel surface of the vehicle M when the power supply coil 1a is in a horizontal position. Moreover, a receiving portion 1g that abuts the end portion of the power supply coil 1a when in a horizontal position is formed at one of the pair of vertical surfaces not supporting the pair of rotation shafts 1b and 1b, at a region facing the travel surface.

The reducer 1d is provided between one of the pair of rotation shafts 1b and 1b and the output shaft of the motor 1e, and is a gear mechanism that reduces rotation of the output shaft to be transmitted to the rotation shaft 1b. The motor 1e is an actuator that changes the power supply coil 1a to a horizontal position or a vertical position by rotating the rotation shaft 1b via the reducer 1d. Note that, as the actuator, a hydraulic cylinder or an air cylinder may be used instead of the motor 1e.

The vehicle sensor 2 is a monitoring sensor that detects the entry of the vehicle M (movable body) into the parking space P. The vehicle sensor 2 detects the vehicle M entering the parking space P using, for example, a medium such as infrared light or laser light. The vehicle sensor 2 outputs a detection signal (electrical signal) indicating the vehicle M detection result to the position control portion 3. The position control portion 3 is a controller that controls the motor 1e based on the detection signal.

That is to say, the position control portion 3 sets the end surface 1f of the power supply coil 1a to the vertical position in the state of the vehicle sensor 2 not detecting the entry of the vehicle M into the parking space P, and changes the position of the end surface 1f of the power supply coil 1a from the vertical position to the horizontal position upon detection of entry of the vehicle M into the parking space P.

The electric power supply control portion 4 is a controller that controls the supply of electrical power (alternating-current power) to the power supply coil 1a based on a position signal input from the position control portion 3. The electric power supply control portion 4 is constituted from an inverter circuit (electrical power converter) that outputs alternating-current power to the power supply coil 1a and an inverter control circuit that supplies a switching signal that is an operation signal to the inverter circuit. Note that the electric power supply control portion 4 is connected by a power cable having flexibility to the power supply coil 1a, whose position freely changes.

Next, the operation of the wireless power supply device according to the first embodiment will be described in detail.

The vehicle sensor 2 of the wireless power supply device, for example, monitors all the time or at a predetermined time interval the state of the vicinity of the opening for entry of the vehicle M in the parking space P, and upon detecting that the vehicle M has entered the vicinity of the entry opening, outputs to the position control portion 3 a detection signal (vehicle detection signal) indicating entry of the vehicle M. Then, the position control portion 3, upon the input of the vehicle detection signal from the vehicle sensor 2, outputs a drive signal to the motor 1e to change the position of the end surface 1f of the power supply coil 1a from a vertical position to a horizontal position.

In the case of the vehicle sensor 2 not detecting the entry of the vehicle M into the parking space P, it outputs a detection signal indicating that entry of the vehicle M has not been detected (vehicle non-detection signal) to the position control portion 3. In the state of the vehicle non-detection signal being input, the position control portion 3 stops the output of the drive signal to the motor 1e to keep the end surface 1f of the power supply coil 1a in a vertical position.

That is to say, the position of the power supply coil 1a is normally set to a vertical position as shown in FIG. 1, FIG. 2A and FIG. 2B, and only when the vehicle M has entered the parking space P, as shown by the arrow in FIG. 2A, it is rotated 90 degrees clockwise to be set to a position in which the end portion abuts the receiving portion 1g of the housing frame 1c, that is, a horizontal position.

Then, when the change of the position of the power supply coil 1a from the vertical position to the horizontal position is completed, the position control portion 3 outputs a position signal indicating the change of the power supply coil 1a to the electric power supply control portion 4. Then, the electric power supply control portion 4, upon receiving the position signal, starts the output of alternating-current power to the power supply coil 1a. That is, the electric power supply control portion 4 does not output alternating-current power to the power supply coil 1a until the position signal is input from the position control portion 3.

According to the present embodiment, since the power supply coil 1a is set to a vertical position until the vehicle M enters the parking space P, in the case of for example a foreign object having dropped from above, the foreign object is housed in the housing frame 1c without attaching to the end surface 1f (electric power supply surface) of the power supply coil 1a because of the action of gravity. Accordingly, with the present embodiment it is possible to remove more reliably than before a foreign object from the end surface 1f (electric power supply surface).

Hereinafter, a wireless power supply device according to the second embodiment of the present invention will be described, referring to the drawings.

Figure 3:
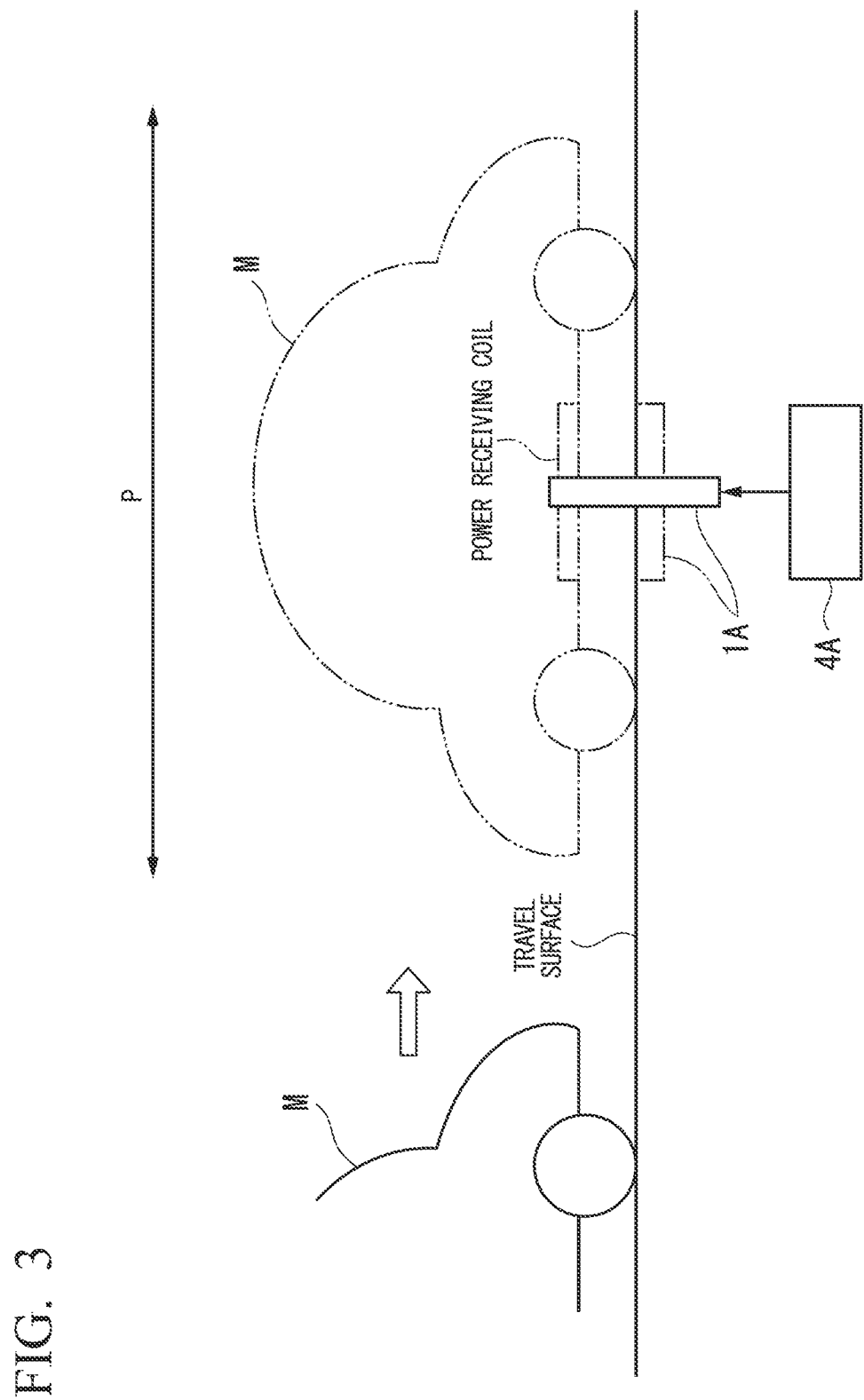
FIG. 3 is a block drawing of the wireless power supply device according to the second embodiment of the present invention.

The wireless power supply device according to the present embodiment, as shown in FIG. 3, is constituted by a power supply coil mechanism 1A and an electric power supply control portion (electric power supply controller) 4A. Note that among these constituent elements, the power supply coil mechanism 1A constitutes the position setting member in the present embodiment.

The wireless power supply device is provided in various types of parking spaces P (rectangular regions). A vehicle M enters the parking space P from a predetermined direction and parks, and leaves in the predetermined direction. The parking space P is provided on the site (on the ground surface) of for example a commercial facility, or in an automated parking lot (multistory parking lot) provided as machinery equipment in a commercial facility.

The power supply coil mechanism 1A is embedded in the travel surface of the parking space P (electric power supply space) as shown in FIG. 3, and is set to a vertical position (shown by solid line) in the state of the vehicle M (movable body) not having entered the parking space P (electric power supply space), and is set to a horizontal position (shown by two-dot chain line) in the state of the vehicle M having entered the parking space P (electric power supply space). The power supply coil mechanism 1A wirelessly transmits electric power to the vehicle M by mutually facing from a fixed distance and electromagnetically coupling with a power receiving coil that is provided in a horizontal position in the vehicle M.

Figure 4A:
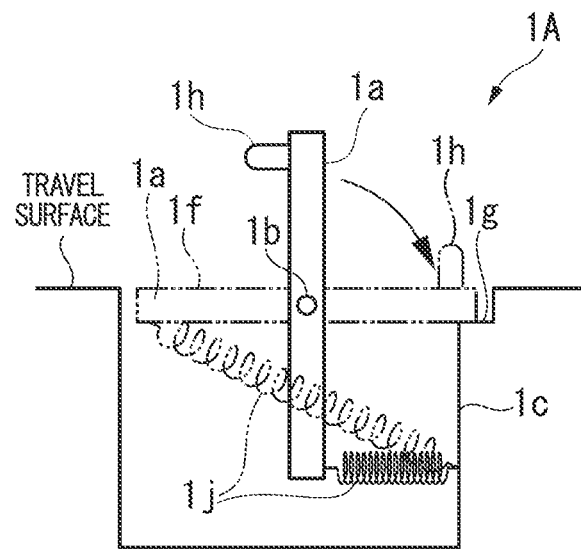
FIG. 4A is a schematic drawing showing the detailed constitution of the power supply coil mechanism of the wireless power supply device according to the second embodiment of the present invention.
Figure 4B:
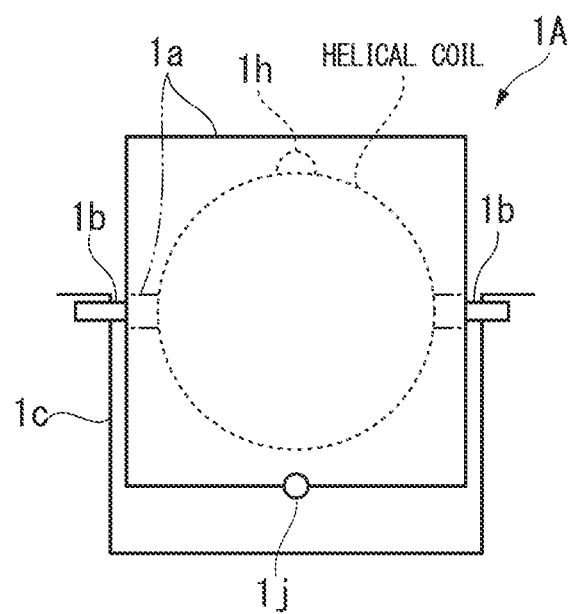
FIG. 4B is a schematic drawing showing the detailed constitution of the power supply coil mechanism of the wireless power supply device according to the second embodiment of the present invention.
Figure 4C:
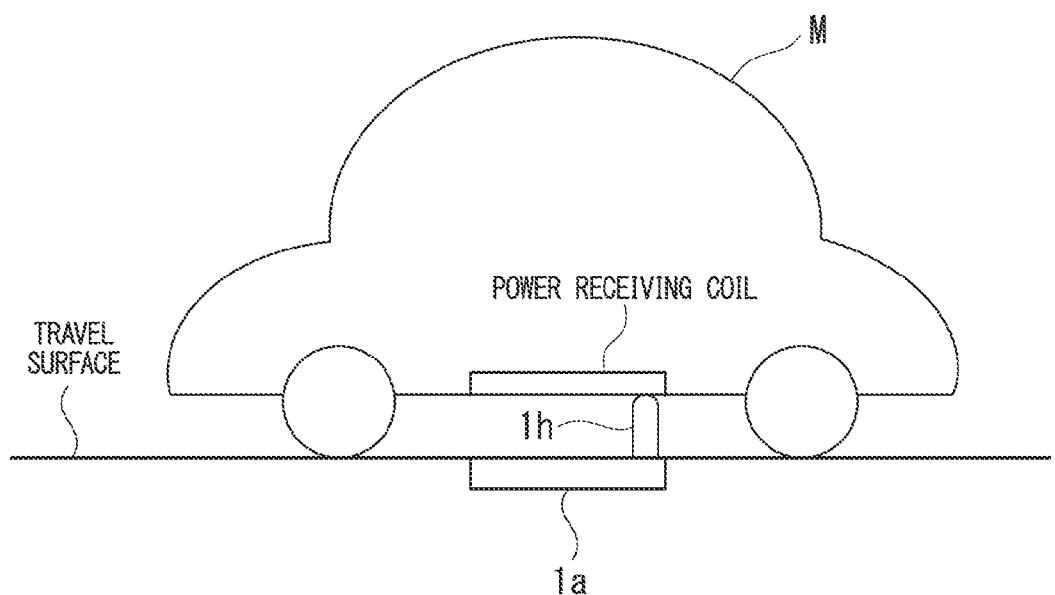
FIG. 4C is a schematic drawing showing the detailed constitution of the power supply coil mechanism of the wireless power supply device according to the second embodiment of the present invention.

Note that in FIG. 3, in order to make the characteristic of the power supply coil mechanism 1A easily understood, the position of the power supply coil mechanism 1A is schematically shown to change depending on the existence of the vehicle M, but the member that actually changes between a vertical position and a horizontal position by the existence of the vehicle M is a power supply coil 1a that is one of the constituent elements of the power supply coil mechanism 1A as shown in FIG. 4A, FIG. 4B and FIG. 4C.

That is to say, the power supply coil mechanism 1A is constituted by the power supply coil 1a, a pair of rotation shafts 1b and 1b, a housing frame 1c, an abutting portion 1h, and a coil spring 1j (an elastic body). Among these constituent elements, the power supply coil 1a has the same shape, constitution, and function as the power supply coil 1a in the first embodiment, and wirelessly transmits electric power to the vehicle M by electromagnetically coupling with the power receiving coil through an end surface 1f of the power supply coil 1a, that is, the upper surface (electric power supply surface) that mutually faces the power receiving coil (horizontal position) of the vehicle M when the power supply coil 1a is in a horizontal position.

Similarly to the pair of rotation shafts 1b and 1b in the first embodiment, the pair of rotation shafts 1b and 1b are each provided in a projecting manner so that both axial centers are coaxial at the center of one pair of two pairs of parallel surfaces (side surfaces of the power supply coil 1a) that are perpendicular to the end surface 1f. That is to say, both axial centers of the one pair of rotation shafts 1b and 1b pass through the center of the power supply coil 1a, and project out from both ends of the power supply coil 1a so as to be parallel to the end surface 1f. Moreover, the housing frame 1c also has the same shape, constitution, and function as the housing frame 1c in the first embodiment.

The abutting portion 1h is provided on the end surface 1f of the power supply coil 1a so as to project out, and abuts the vehicle M that has entered the parking space P. Moreover, the coil spring 1j is provided between the power supply coil 1a and the housing frame 1c, and by biasing the power supply coil 1a to a predetermined direction, puts the power supply coil 1a in a vertical position under normal conditions.

The electric power supply control portion 4A is a controller that controls the supply of electrical power (alternating-current power) to the power supply coil 1a by judging whether the power supply coil 1a is in a horizontal position. The electric power supply control portion 4A is constituted from an inverter circuit (electrical power converter) that outputs alternating-current power to the power supply coil 1a and an inverter control circuit that supplies a switching signal that is an operation signal to the inverter circuit.

Note that the electric power supply control portion 4A is connected by a power cable having flexibility to the power supply coil 1a, whose position freely changes. In the present embodiment, when the power supply coil 1a is in a horizontal position, the power supply coil 1a is abutting the receiving portion 1g. Accordingly, as a method to judge whether or not the power supply coil 1a is in a horizontal position, for example a touch sensor may be provided on the upper surface (end portion) of the receiving portion 1g to detect whether the lower surface of the power supply coil 1a that is in a horizontal position is pressing the touch sensor.

It is desirable that the power cable be a cable in which insulated twisted wires that are mutually twisted together are covered with a metallic foil or metallic mesh so as to reduce high-frequency radiation.

Next, the operation of the wireless power supply device according to the second embodiment will be described in detail.

In the power supply coil mechanism 1A, the power supply coil 1a maintains a vertical position by the biasing force of the coil spring 1j in the normal state. When the vehicle M enters the parking space P, the rear portion (or the end portion) of the vehicle M abuts the abutting portion 1h, whereby the position of the power supply coil 1a changes from the vertical position to the horizontal position. Moreover, the horizontal position is maintained by the abutting portion 1b continuing to abut the bottom of the vehicle M. That is, the power supply coil mechanism 1A, in addition to detecting the entry of the vehicle M into the parking space P, the electric power supply mechanism 1A utilizes the movement of the vehicle M as a power source for changing the position of the power supply coil 1a.

That is to say, the position of the power supply coil 1a is normally set to a vertical position as shown in FIG. 3 and FIG. 4A, FIG. 4B and FIG. 4C, and only when the vehicle M has entered the parking space P, as shown by the arrow in FIG. 4A, it is rotated 90 degrees clockwise to be set to a position in which the end portion abuts the receiving portion 1g of the housing frame 1c, that is, a horizontal position.

When the power supply coil 1a is judged to be in a horizontal position, the electric power supply control portion 4A starts the output of alternating-current power to the power supply coil 1a. That is, until the vehicle M enters the electric power supply parking space P, and the position of the power supply coil 1a changes from the vertical position to the horizontal position, the electric power supply control portion 4A does not output alternating-current power to the power supply coil 1a.

According to the wireless power supply device according to the second embodiment, similarly to the wireless power supply device according to the first embodiment, since the power supply coil 1a is set to a vertical position until the vehicle M enters the parking space P, it is possible to remove more reliably than before foreign object from the end surface 1f (electric power supply surface).

Note that the present invention is not limited to the first embodiment and the second embodiment described above, and for example the following modifications are also conceivable.

Figure 5A:
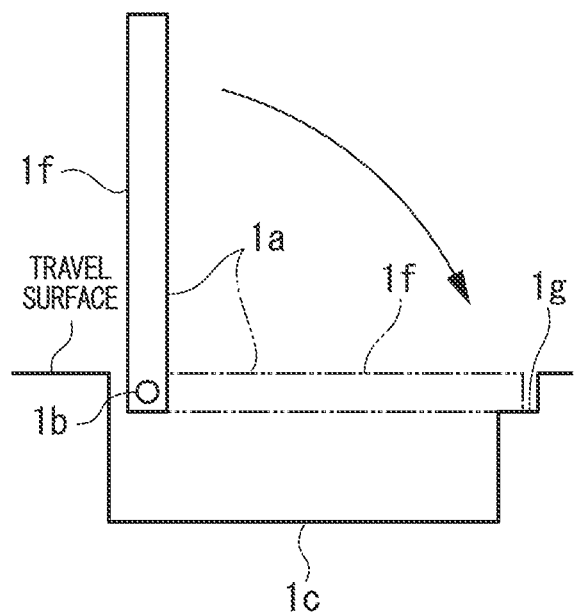
FIG. 5A is a schematic drawing showing a modification of the power supply coil mechanism of the wireless power supply device according to the first embodiment of the present invention.
Figure 5B:
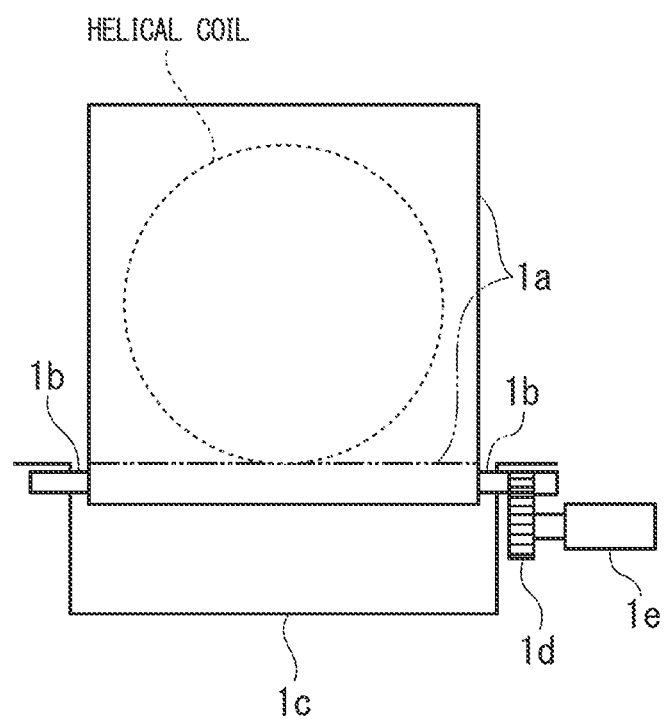
FIG. 5B is a schematic drawing showing a modification of the power supply coil mechanism of the wireless power supply device according to the first embodiment of the present invention.

(1) In the first embodiment described above, the pair of rotation shafts 1b and 1b are provided at the center of one pair of two pairs of parallel surfaces (side surfaces of the power supply coil 1a) that are perpendicular to the end surface 1f, but the present invention is not limited to this. As shown in FIGS. 5A and 5B, the pair of rotation shafts 1b and 1b may also be provided at the end portion of each parallel surface in one pair of the two pairs of parallel surfaces (side surfaces of the power supply coil 1a) that are perpendicular to the end surface 1f. Similarly in the second embodiment, the pair of rotation shafts 1b and 1b may also be provided at the end portion of each parallel surface in one pair of the two pairs of parallel surfaces (side surfaces of the power supply coil 1a) that are perpendicular to the end surface 1f.

Figure 6A:
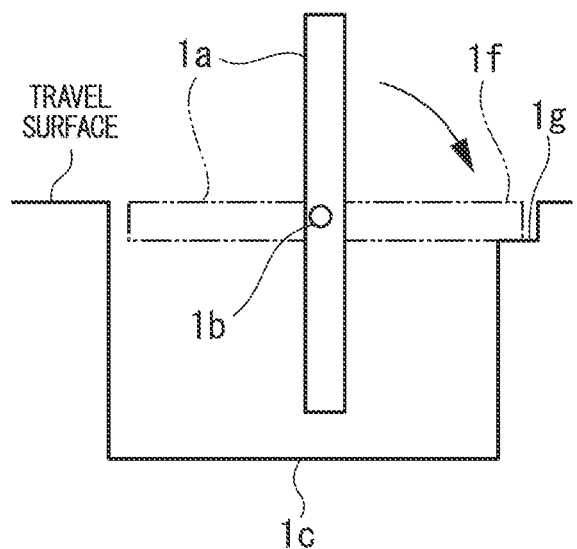
FIG. 6A is a schematic drawing showing another modification of the power supply coil mechanism of the wireless power supply device according to the first embodiment of the present invention.
Figure 6B:
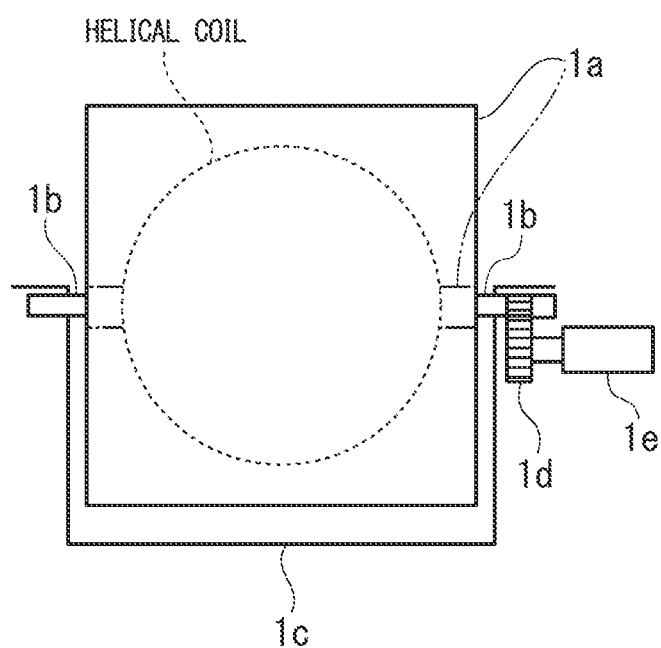
FIG. 6B is a schematic drawing showing another modification of the power supply coil mechanism of the wireless power supply device according to the first embodiment of the present invention.

(2) In the first embodiment and in the second embodiment described above, as shown in FIGS. 6A and 6B, the pair of rotation shafts 1b and 1b may be provided so that the rotation shafts 1b and 1b or their extensions pass through the gravity center of the power supply coil 1a.

In the case of providing the pair of rotation shafts 1b and 1b at the center of one pair of two pairs of parallel surfaces (side surfaces of the power supply coil 1a) that are perpendicular to the end surface 1f as shown in FIGS. 2A and 2B, it is necessary to comparatively increase the height dimension of the housing frame 1c in order to house the lower half portion of the power supply coil 1a in a vertical position. In contrast, in the case of providing the pair of rotation shafts 1b and 1b at the end portion of any one surface of the two pairs of parallel surfaces (side surfaces of the power supply coil 1a) that are perpendicular to the end surface 1f as shown in FIG. 5A and FIG. SB, there is no need to house the lower half portion of the power supply coil 1a, so it is possible to comparatively reduce the height dimension of the housing frame 1c. Being able to reduce the height dimension of the housing frame 1c is advantageous in terms of man hours and cost when installing the power supply coil mechanism in the travel surface.

In contrast, in the case of providing the pair of rotation shafts 1b and 1b or its extensions so as to pass through the gravity center of the power supply coil 1a, the weight is balanced on both sides of the rotation shafts. For that reason, even if the torque or force generated by the motor or coil spring is small, it is possible to cause the power supply coil 1a to rotate around its rotation axis, so there is the advantage of being able to downsize the motor or coil spring.

(3) In the first embodiment and in the second embodiment described above, the receiving portion 1g that receives the end portion of the power supply coil 1a in a horizontal position is formed at one of the pair of vertical surfaces of the housing frame IC not supporting the pair of rotation shafts 1b and 1b, at a region facing the travel surface. In addition to this, a projection that projects upward may be provided for example at the bottom portion of the housing frame 1c as a support member that further stabilizes the position of the power supply coil 1a in a vertical position, and one surface of the power supply coil 1a may be received by the projection.

(4) In the first embodiment and the second embodiment described above, the power supply coil 1a is constituted to switch between a vertical position and a horizontal position by rotation about the rotation shafts 1b and 1b, thereby the power supply coil 1a when in a vertical position comes to project upward from the travel surface. When projection of the power supply coil 1a from the travel surface in this manner is inconvenient, it is conceivable for example, to constitute the pair of bearings provided in the housing body 1c for supporting the rotation shafts 1b and 1b so as to support them with an elevating mechanism, and thereby lower the power supply coil 1a in a vertical position to cause it not to project out from the travel surface.

(5) In the first embodiment and in the second embodiment described above, the electric wires that constitute the interior of the power supply coil 1a are not limited to a helical coil, and provided wireless electric power supply is possible in which electromagnetic coupling occurs between the power supply coil and the power receiving coil when the power supply coil has become horizontal, the shape of the winding of the electric wires and the shape of the coil may be arbitrary. The method of casting the power supply coil 1a is also not limited to a mold, and provided it is a method that can hold a shape and fix the electric wires with a material that allows an electromagnetic field to pass through, any method will suffice. For example, the electric wires may be wound and housed in a housing with a rectangular parallelopiped shape made of FRP (fiber reinforced plastic), with the electric wires held by a plastic fastener.

INDUSTRIAL APPLICABILITY

The wireless power supply system of the present invention can prevent the intrusion of a foreign object between the power supply coil and the power receiving coil.

What is claimed is:

1. A wireless power supply device that supplies electric power to a movable body by causing an end surface of a power supply coil that is provided in an electric power supply space to face a power receiving coil that is provided in the movable body, and by electromagnetically coupling the power supply coil with the power receiving coil, the wireless power supply device comprising:
a position setting member configured to set the end surface of the power supply coil in a vertical position in a state of not detecting entry of the movable body into the electric power supply space, and to cause a position of the end surface of the power supply coil to change from the vertical position to a horizontal position upon detecting entry of the movable body into the electric power supply space, wherein
the power supply coil is provided with a rotating shaft, and
an axial center of the rotating shaft is parallel to the end surface of the power supply coil.

2. The wireless power supply device according to claim 1, wherein the position setting member comprises:
a moving body sensor configured to detect entry of the moving body into the electric power supply space;
a support mechanism configured to rotatably support the power supply coil around the rotating shaft;
an actuator configured to rotate the power supply coil; and
a position control portion configured to control the actuator based on a detection result of the moving body sensor.

3. The wireless power supply device according to claim 1, wherein the position setting member comprises:
a support mechanism configured to rotatably support the power supply coil around the rotating shaft;
an elastic body configured to bias the power supply coil in a predetermined direction to set the power supply coil in a vertical position; and
an abutting portion configured to be provided on the power supply coil, and to cause the position of the power supply coil to change from the vertical position to the horizontal position by abutting the movable body that has entered the electric power supply space.

4. The wireless power supply device according to claim 2, wherein the axis of the power supply coil is configured to pass through a center or gravity center of the power supply coil.

5. The wireless power supply device according to claim 3, wherein the axis of the power supply coil is configured to pass through a center or gravity center of the power supply coil.

6. The wireless power supply device according to claim 2, wherein the axis of the power supply coil is configured to pass through an end portion of the power supply coil.

7. The wireless power supply device according to claim 3, wherein the axis of the power supply coil is configured to pass through an end portion of the power supply coil.

8. The wireless power supply device according to claim 1, wherein when the power supply coil is in horizontal position, the end surface is flush with travel surface of the movable body.

* * * * *